(12) United States Patent
Mimura et al.

(10) Patent No.: US 11,862,160 B2
(45) Date of Patent: Jan. 2, 2024

(54) CONTROL METHOD FOR DISPLAY SYSTEM, AND DISPLAY SYSTEM

(71) Applicant: SEIKO EPSON CORPORATION, Tokyo (JP)

(72) Inventors: Nona Mimura, Matsumoto (JP); Mitsunori Tomono, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 241 days.

(21) Appl. No.: 17/511,716

(22) Filed: Oct. 27, 2021

(65) Prior Publication Data

US 2022/0130382 A1 Apr. 28, 2022

(30) Foreign Application Priority Data

Oct. 27, 2020 (JP) ................................. 2020-179515

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
USPC .................................................. 704/251, 231
See application file for complete search history.

(56) References Cited

U.S. PATENT DOCUMENTS

| 6,597,378 | B1 * | 7/2003 | Shiraishi | G06F 3/1454 715/764 |
| 6,621,508 | B1 * | 9/2003 | Shiraishi | G06F 3/0481 715/764 |
| 6,809,724 | B1 * | 10/2004 | Shiraishi | G06F 1/1684 345/157 |
| 9,697,202 | B2 * | 7/2017 | Sharma | H04W 4/80 |

(Continued)

FOREIGN PATENT DOCUMENTS

JP 2019-091332 6/2019
JP 2019-204524 11/2019
JP 2020-087347 6/2020

*Primary Examiner* — Marcus T Riley
(74) *Attorney, Agent, or Firm* — Dority & Manning, P.A.

(57) ABSTRACT

A control method for a display system is provided. The display system includes a display device displaying an image, and a voice processing device which generates first voice data based on a first voice requesting a first-type operation belonging to a part of a plurality of types of operations to the display device and transmits the first voice data to a server device. The display device receives a command to execute the first-type operation from the server device. The display device includes a voice recognition unit recognizing a second voice requesting a second-type operation that is different from the first-type operation, and a control unit controlling execution of the first-type operation and the second-type operation. The voice processing device transmits the first voice data requesting a permission for the execution of the second-type operation, to the server device. The display device receives a command permitting the execution of the second-type operation from the server device. The control unit starts the execution of the second-type operation in response to the command permitting the execution of the second-type operation.

9 Claims, 5 Drawing Sheets

(56) References Cited

U.S. PATENT DOCUMENTS

| | | | |
|---|---|---|---|
| 10,586,536 B2 * | 3/2020 | Jeong ...................... G06F 3/167 |
| 11,196,880 B2 * | 12/2021 | Fujisawa ................ G06F 3/1288 |
| 2015/0278679 A1 * | 10/2015 | Sharma ................... H04L 63/08 |
| | | | 706/11 |
| 2016/0191673 A1 * | 6/2016 | Bohannon ............... H04L 67/59 |
| | | | 709/213 |
| 2017/0256260 A1 * | 9/2017 | Jeong ........................ G06F 3/16 |
| 2018/0047194 A1 * | 2/2018 | Shirai .................... G16H 10/20 |
| 2019/0258455 A1 * | 8/2019 | Nakazawa .............. G06F 3/167 |
| 2020/0175984 A1 * | 6/2020 | Iwasa ...................... G10L 15/22 |
| 2020/0404110 A1 * | 12/2020 | Fujisawa ................ G06F 3/1268 |
| 2022/0130382 A1 * | 4/2022 | Mimura .................. G10L 15/22 |

\* cited by examiner

CONTROL METHOD FOR DISPLAY SYSTEM, AND DISPLAY SYSTEM

The present application is based on, and claims priority from JP Application Serial Number 2020-179515, filed Oct. 27, 2020, the disclosure of which is hereby incorporated by reference herein in its entirety.

BACKGROUND

1. Technical Field

The present disclosure relates to a control method for a display system, and a display system.

2. Related Art

JP-A-2020-87347 discloses a voice operation system which operates an image forming device, based on an interaction with a user via a smart speaker. In this voice operation system, the image forming device to be operated, the smart speaker, and a server giving an operation command to the image forming device, are connected together via a network. When the user utters an operation content for the image forming device, the smart speaker transmits the operation content to the server. The server transmits an operation command to the image forming device, based on the operation content received from the smart speaker.

In the voice operation system described in JP-A-2020-87347, communication from the smart speaker to the server and communication from the server to the image forming device are needed every time the user wants an operation to be performed. Therefore, it takes time until an operation content uttered by the user reaches the image forming device as an operation command.

SUMMARY

A control method for a display system is provided. The display system includes a display device displaying an image, and a voice processing device which generates first voice data based on a first voice requesting a first-type operation belonging to a part of a plurality of types of operations to the display device and transmits the first voice data that is generated, to a server device. The display device receives a command to execute the first-type operation from the server device. The display device includes a voice recognition unit recognizing a second voice requesting a second-type operation that is different from the first-type operation, of the plurality of types of operations, and a control unit controlling execution of the first-type operation and the second-type operation. The method includes causing the voice processing device to transmit the first voice data generated based on the first voice requesting a permission for the execution of the second-type operation, to the server device; causing the display device to receive a command permitting the execution of the second-type operation from the server device; and causing the control unit to start the execution of the second-type operation based on the second voice recognized by the voice recognition unit, in response to the command permitting the execution of the second-type operation.

A display system is provided. The display system includes a display device displaying an image, and a voice processing device which generates first voice data based on a first voice requesting a first-type operation belonging to a part of a plurality of types of operations to the display device and transmits the first voice data that is generated, to a server device. The display device receives a command to execute the first-type operation from the server device. The display device includes a voice recognition unit recognizing a second voice requesting a second-type operation that is different from the first-type operation, of the plurality of types of operations, and a control unit controlling execution of the first-type operation and the second-type operation. The voice processing device transmits the first voice data generated based on the first voice requesting a permission for the execution of the second-type operation, to the server device. The display device receives a command permitting the execution of the second-type operation from the server device. The control unit starts the execution of the second-type operation based on the second voice recognized by the voice recognition unit, in response to the command permitting the execution of the second-type operation.

DESCRIPTION OF EXEMPLARY EMBODIMENTS

Figure 1:
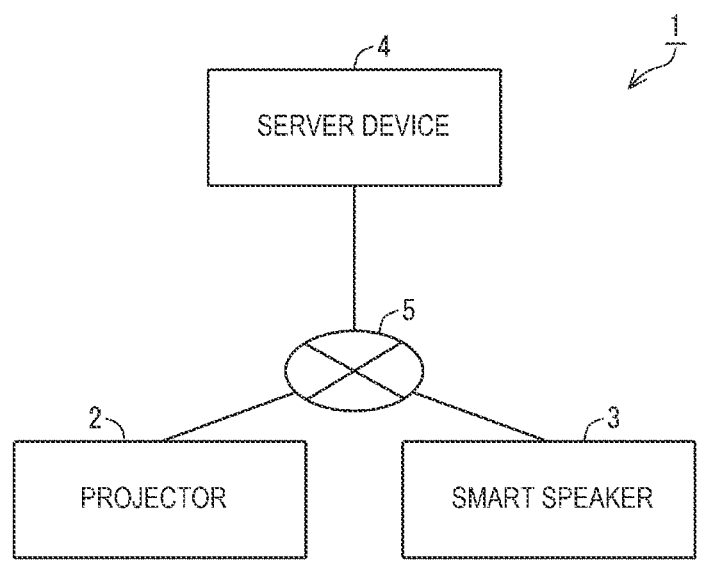
FIG. 1 explains the configuration of a display system according to a first embodiment.

A display system 1 according to a first embodiment has a projector 2, a smart speaker 3, and a server device 4, as shown in FIG. 1. The projector 2 is an example of a display device. The smart speaker 3 is an example of a voice processing device. The projector 2, the smart speaker 3, and the server device 4 are connected to each other via a network 5.

Figure 2:
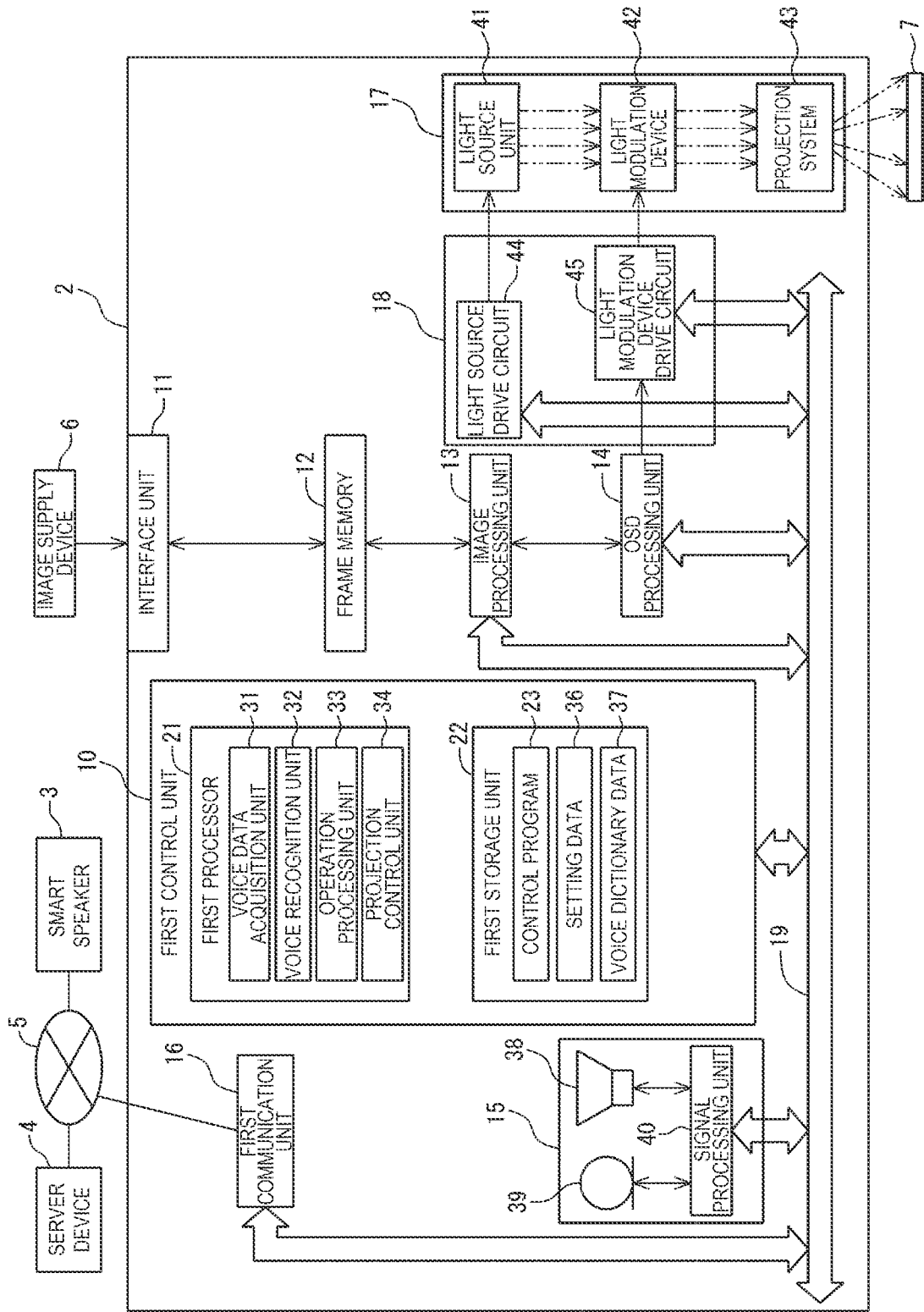
FIG. 2 is a block diagram explaining the configuration of a projector in the first embodiment.

The projector 2 displays an image on a screen 7 or the like, based on image data supplied from an image supply device 6 shown in FIG. 2. The image supply device 6 is a disk-type recording medium playback device, a television tuner device, a personal computer or the like. The data supplied from the image supply device 6 to the projector 2 is not limited to image data and also includes data relating to a voice. The data relating to a voice is, for example, data in which a voice is played back along with a dynamic image of a movie that is displayed. The dynamic image is not limited to a movie and includes various dynamic images such as a television program or a video distributed via the internet. Also, the image data supplied from the image supply device 6 is not limited to data relating to a dynamic image and also includes a still image. The data supplied from the image supply device 6 includes data in which a voice is played back along with a still image that is displayed.

Referring back to FIG. 1, the smart speaker 3 is a device implementing a voice assistant function. The voice assistant function is a function of implementing an operation in response to a question or a request uttered by a user. The server device 4 provides various kinds of information, data, an operation command or the like to a device connected thereto via the network 5. In this embodiment, the projector 2 can be operated, based on a voice of an utterance of the user. The smart speaker 3 generates voice data based on the voice of the utterance of the user. The smart speaker 3 transmits the voice data to the server device 4. The server device 4 analyzes the voice data received from the smart speaker 3 and transmits, to the projector 2, a command to execute an operation to the projector 2. The projector 2 executes the operation in response to the command received from the server device 4. The voice assistant function is thus implemented.

Various operations to the projector 2 are classified into a plurality of types. Of the plurality of types of operations, an operation belonging to a first type, which is a part of the types, is referred to as a first-type operation. Of the plurality of types of operations, an operation belonging to a second type, which is a different type from the first type, is referred to as a second-type operation. When the content of an utterance of the user of the display system 1 is to request a first-type operation to the projector 2, the voice of the utterance of the user is defined as a first voice. Voice data based on a first voice is referred to as first voice data. When the content of an utterance of the user of the display system 1 is to request a second-type operation to the projector 2, the voice of the utterance of the user is defined as a second voice. Voice data based on a second voice is referred to as second voice data.

In this embodiment, when the voice of an utterance of the user is a first voice requesting a first-type operation, the server device 4 analyzes voice data received from the smart speaker 3 and transmits, to the projector 2, a command to execute the first-type operation to the projector 2. A second-type operation is performed by the projector 2 recognizing a second voice of an utterance of the user, without going through the server device 4. The second-type operation includes adjustment of the volume of the projector 2 and adjustment of the image quality of a display image displayed by the projector 2. The adjustment of the image quality of the display image includes adjustment of the brightness of the display image, adjustment of the contrast of the display image, enlargement and reduction of the display image, and the like. That is, in this embodiment, the projector 2 can perform these adjustment operations by recognizing a second voice of an utterance of the user, without going through the server device 4.

As shown in FIG. 2, the projector 2 has a first control unit 10, an interface unit 11, a frame memory 12, an image processing unit 13, an OSD processing unit 14, a voice input-output unit 15, a first communication unit 16, a projection unit 17, and a drive unit 18. These units are communicatively coupled to the first control unit 10 via a bus 19. The first control unit 10 has a first processor 21 and a first storage unit 22. The first control unit 10 comprehensively controls the operations of the projector 2. The first processor 21 reads out a control program 23 saved in the first storage unit 22 and executes various kinds of processing. The first control unit 10 executes various kinds of processing by the cooperation of hardware and software.

In the first control unit 10, the first processor 21 executes processing based on the control program 23 and thus functions as a voice data acquisition unit 31, a voice recognition unit 32, an operation processing unit 33, and a projection control unit 34. The first storage unit 22 stores setting data 36 and voice dictionary data 37 in addition to the control program 23. The first storage unit 22 has a non-volatile storage area and a volatile storage area. The control program 23, the setting data 36, and the voice dictionary data 37 are saved in the non-volatile storage area of the first storage unit 22. The volatile storage area forms a work area for temporarily storing a program executed by the first processor 21 and various data.

The setting data 36 includes a set value relating to the operation of the projector 2. The set value included in the setting data 36 is, for example, a set value representing the volume level of a voice outputted from a speaker 38, described later, a set value representing the content of processing executed by the image processing unit 13 and the OSD processing unit 14, a parameter used for the processing by the image processing unit 13 and the OSD processing unit 14, or the like. The voice dictionary data 37 is data for converting a voice of the user detected by a microphone 39, described later, into data that can be recognized by the voice recognition unit 32. For example, the voice dictionary data 37 includes dictionary data for converting digital data of a voice of the user into text data in Japanese, English or another language. The voice dictionary data 37 also includes data representing the content of the foregoing second-type operation.

The interface unit 11 has communication hardware such as a connector and an interface circuit conforming to a predetermined communication standard. The interface unit 11 transmits and receives image data, voice data, control data and the like to and from the image supply device 6, under the control of the first control unit 10.

The frame memory 12, the image processing unit 13, and the OSD processing unit 14 are formed, for example, of an integrated circuit. In the frame memory 12, image data received from the image supply device 6 is temporarily loaded. The image processing unit 13 performs various kinds of image processing on the image data loaded in the frame memory 12, based on an instruction from the first control unit 10. The image processing is, for example, resolution conversion, resizing, correction of a distortion, shape correction, digital zoom, adjustment of the color tone and luminance of an image, or the like. The image processing unit 13 reads out the image data that has been processed from the frame memory 12 and outputs the image data to the OSD processing unit 14.

The OSD processing unit 14, under the control of the first control unit 10, superimposes various OSD (on-screen display) images on an image represented by the image data inputted from the image processing unit 13. The OSD image is a menu image for various settings of the projector 2, a message image for giving various messages, or the like. The OSD processing unit 14 combines the image data inputted from the image processing unit 13 with the image data of the OSD image, under the control of the first control unit 10. The combined image data is outputted to the drive unit 18. When the first control unit 10 gives no instruction to superimpose an OSD image, the OSD processing unit 14 outputs the image data inputted from the image processing unit 13, directly to the drive unit 18 without processing the image data.

The voice input-output unit 15 has the speaker 38, the microphone 39, and a signal processing unit 40. When digital voice data is inputted to the signal processing unit 40 from the first control unit 10, the signal processing unit 40 converts the inputted digital voice data into analog voice data. The signal processing unit 40 outputs the converted analog voice data to the speaker 38. The speaker 38 outputs a voice based on the inputted voice data. The voice outputted from the speaker 38 includes a voice supplied from the image supply device 6, a voice giving various messages, or the like. The microphone 39 detects a voice in the peripheries of the projector 2. Analog voice data is inputted to the signal processing unit 40 via the microphone 39. The signal processing unit 40 converts the analog voice data inputted from the microphone 39 into digital voice data. The signal processing unit 40 outputs the digital voice data to the first control unit 10.

The first communication unit 16 has communication hardware conforming to a predetermined communication standard and communicates with a device connected to the network 5 according to the predetermined communication standard under the control of the first control unit 10. The first communication unit 16 in this embodiment can communicate with the server device 4 via the network 5. The communication standard used by the first communication unit 16 may be a wireless communication standard or a wired communication standard.

The projection unit 17 has a light source unit 41, a light modulation device 42, and a projection system 43. The drive unit 18 has a light source drive circuit 44 and a light modulation device drive circuit 45. The light source drive circuit 44 is coupled to the first control unit 10 via the bus 19. The light source drive circuit 44 is also coupled to the light source unit 41. The light source drive circuit 44 controls the light emission of the light source unit 41 under the control of the first control unit 10. The control of the light emission includes not only a control to turn on and off the light source unit 41 but also a control on the intensity of the light emission of the light source unit 41.

The light modulation device drive circuit 45 is coupled to the first control unit 10 via the bus 19. The light modulation device drive circuit 45 is also coupled to the light modulation device 42. The light modulation device drive circuit 45, under the control of the first control unit 10, drives the light modulation device 42 and draws an image on a frame basis at a light modulation element provided in the light modulation device 42. Image data corresponding to each of the primary colors of R, G, and B is inputted to the light modulation device drive circuit 45 from the image processing unit 13. The light modulation device drive circuit 45 converts the inputted image data into a data signal suitable for the operation of a liquid crystal panel that is the light modulation element provided in the light modulation device 42. The light modulation device drive circuit 45 applies a voltage to each pixel in each liquid crystal panel, based on the converted data signal, and thus draws an image on each liquid crystal panel.

The light source unit 41 is formed of a lamp such as a halogen lamp, a xenon lamp, or an ultra-high-pressure mercury lamp, or a solid-state light source such as an LED or a laser light source. The light source unit 41 turns on with electric power supplied from the light source drive circuit 44 and emits light toward the light modulation device 42.

The light modulation device 42 has, for example, three liquid crystal panels corresponding to the three primary colors of R, G, and B. R represents red. G represents green. B represents blue. The light emitted from the light source unit 41 is separated into color lights of the three colors of R, G, and B, which then become incident on the corresponding liquid crystal panels. Each of the three liquid crystal panels is a transmission-type liquid crystal panel, and modulates light transmitted therethrough and thus generates image light. The image lights passed and modulated through the respective liquid crystal panels are combined together by a light combining system such as a cross dichroic prism and emitted to the projection system 43. While a case where the light modulation device 42 has transmission-type liquid crystal panels as light modulation elements is described as example in this embodiment, the light modulation element may be a reflection-type liquid crystal panel or a digital micromirror device.

The projection system 43 has a lens, a mirror, and the like for causing the image light modulated by the light modulation device 42 to form an image on the screen 7. The projection system 43 may have a zoom mechanism for enlarging or reducing an image projected on the screen 7, a focus adjustment mechanism for adjusting the focus, and the like.

The voice data acquisition unit 31 acquires voice data representing a voice detected by the microphone 39, from the voice input-output unit 15. The voice data acquisition unit 31 outputs the acquired voice data to the voice recognition unit 32. The voice recognition unit 32 recognizes the voice detected by the microphone 39, based on the voice data inputted from the voice data acquisition unit 31. The voice recognition unit 32 outputs the result of the voice recognition to the operation processing unit 33.

The recognition of a voice by the voice recognition unit 32 is performed in the following manner. The voice recognition unit 32 converts a voice collected by the microphone 39 into a text. The voice recognition unit 32 analyzes the voice data of the text, referring to the voice dictionary data 37. At this point, the voice recognition unit 32 determines whether a wording that matches the wording represented by the voice data acquired from the microphone 39 is included in the voice dictionary data 37 or not. For example, the voice recognition unit 32 performs character string search through the voice data of the text and thus determines whether the wording represented by the voice data acquired from the microphone 39 is included in the voice dictionary data 37 or not.

When the wording represented by the voice data acquired from the microphone 39 is included in the voice dictionary data 37, the voice recognition unit 32 converts the voice data into a text and thus generates second voice data. The voice recognition unit 32 outputs the second voice data to the operation processing unit 33 as the result of the voice recognition. More specifically, the voice recognition unit 32 outputs the voice data to the operation processing unit 33 with a flag indicating that the voice data converted into the text is second voice data, as the result of the voice recognition. When the wording represented by the voice data acquired from the microphone 39 is not included in the voice dictionary data 37, the voice recognition unit 32 outputs the voice data converted into a text to the operation processing unit 33 as the result of the voice recognition. More specifically, the voice recognition unit 32 outputs the voice data to the operation processing unit 33 without a flag indicating that the voice data converted into the text is second voice data, as the result of the voice recognition.

The operation processing unit 33 executes processing to implement an operation to the projector 2, in response to a command from the server device 4. The operation to the projector 2 includes a first-type operation and a second-type operation, as described above. An operation executed based on a command from the server device 4 is a first-type operation. Meanwhile, a second-type operation is performed by the projector 2 recognizing a second voice of an utterance of the user, without going through the server device 4. A second-type operation is executable when the projector 2 receives a command permitting the execution of the second-type operation from the server device 4. That is, a second-type operation is executable during a period permitted by the server device 4.

When the user makes an utterance requesting the permission for the execution of a second-type operation, the smart speaker 3 transmits first voice data generated based on the first voice of the utterance, to the server device 4. The permission for the execution of a second-type operation is a first-type operation. When the projector 2 receives a command permitting the execution of the second-type operation from the server device 4, the operation processing unit 33 executes processing to implement the second-type operation to the projector 2 in response to a command from the first control unit 10. That is, the operation processing unit 33 executes processing to the projector 2 in response to a command from the first control unit 10 during a period when the execution of the second-type operation is permitted. In this way, the operation processing unit 33 executes the processing to implement a first-type operation and the processing to implement a second-type operation.

The projection control unit 34 controls the image processing unit 13, the OSD processing unit 14, the drive unit 18, and the like, to display an image on the screen 7. At this point, the projection control unit 34 controls the image processing unit 13 and causes the image processing unit 13 to process image data loaded in the frame memory 12. The projection control unit 34 also controls the OSD processing unit 14 and causes the OSD processing unit 14 to process the image data inputted from the image processing unit 13. The projection control unit 34 also controls the light source drive circuit 44 and causes the light source drive circuit 44 to turn on the light source unit 41. The projection control unit 34 also controls the light modulation device drive circuit 45 to drive the light modulation device 42 and causes the projection unit 17 to project image light and display an image on the screen 7. The projection control unit 34 also controls the driving of the projection system 43 to adjust the zoom and the focus of the projection system 43.

Figure 3:
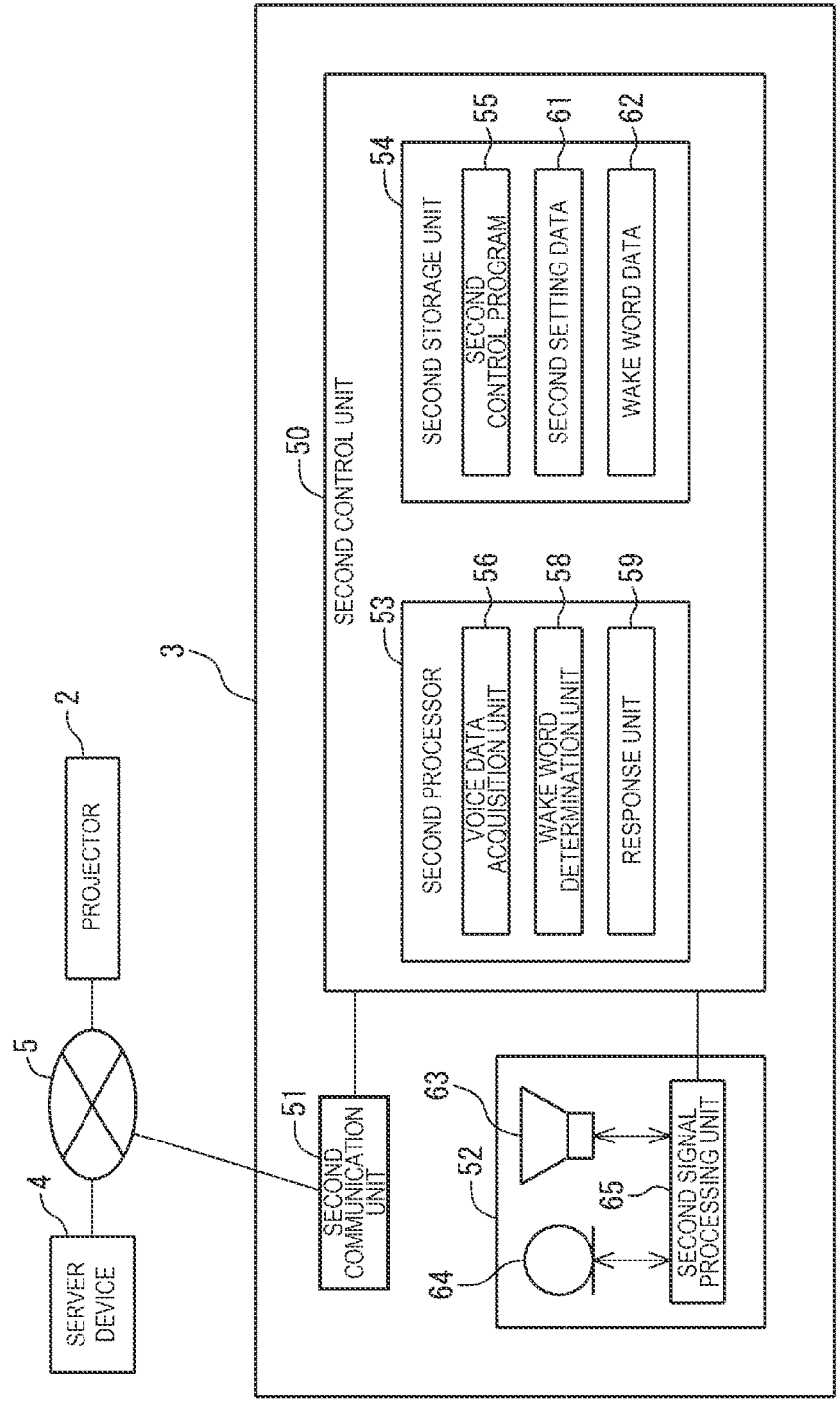
FIG. 3 is a block diagram explaining the configuration of a smart speaker.

As shown in FIG. 3, the smart speaker 3 has a second control unit 50, a second communication unit 51, and a voice input-output unit 52. The second control unit 50 has a second processor 53 and a second storage unit 54. The second control unit 50 comprehensively controls the operations of the smart speaker 3. The second processor 53 reads out a second control program 55 saved in the second storage unit 54 and executes various kinds of processing. The second control unit 50 executes various kinds of processing by the cooperation of hardware and software. In the second control unit 50, the second processor 53 executes processing based on the second control program 55 and thus functions as a voice data acquisition unit 56, a wake word determination unit 58, and a response unit 59.

The second storage unit 54 stores second setting data 61 and wake word data 62 in addition to the second control program 55. The second setting data 61 includes a set value relating to the operation of the smart speaker 3. The wake word data 62 is data representing a wake word, which is a predetermined wording. The wake word is a wording that uniquely specifies the smart speaker 3 and can include any word. The second storage unit 54 has a non-volatile storage area and a volatile storage area. The second control program 55, the second setting data 61, and the wake word data 62 are saved in the non-volatile storage area of the second storage unit 54. The volatile storage area forms a work area for temporarily storing a program executed by the second processor 53 and various data.

The second communication unit 51 has communication hardware conforming to a predetermined communication standard and communicates with a device connected to the network 5 according to the predetermined communication standard under the control of the second control unit 50. The second communication unit 51 in this embodiment can communicate with the server device 4 via the network 5. The communication standard used by the second communication unit 51 may be a wireless communication standard or a wired communication standard.

The voice input-output unit 52 has a second speaker 63, a second microphone 64, and a second signal processing unit 65. When digital voice data is inputted to the second signal processing unit 65 from the second control unit 50, the second signal processing unit 65 converts the inputted digital voice data into analog voice data. The second signal processing unit 65 outputs the converted analog voice data to the second speaker 63. The second speaker 63 outputs a voice based on the inputted voice data. The voice outputted from the second speaker 63 includes a voice supplied from the server device 4, a voice giving various messages, or the like. The second microphone 64 detects a voice in the peripheries of the smart speaker 3. Analog voice data is inputted to the second signal processing unit 65 via the second microphone 64. The second signal processing unit 65 converts the analog voice data inputted from the second microphone 64 into digital voice data. The second signal processing unit 65 outputs the digital voice data to the second control unit 50.

The voice data acquisition unit 56 acquires voice data representing a voice detected by the second microphone 64, from the voice input-output unit 52. The voice data acquisition unit 56 outputs the acquired voice data to the wake word determination unit 58. The wake word determination unit 58 determines whether the voice data includes the wake word or not, based on the voice data inputted from the voice data acquisition unit 56. The wake word determination unit 58 outputs the result of the determination to the server device 4.

The determination of the wake word by the wake word determination unit 58 is performed in the following manner. The wake word determination unit 58 converts a voice collected by the second microphone 64 into a text. The wake word determination unit 58 analyzes the voice data of the text, referring to the wake word data 62. At this point, the wake word determination unit 58 determines whether the voice data of the text includes a wording that matches the wake word or not. The wake word is represented by the wake word data 62.

The wake word determination unit 58 determines whether the voice data of the text includes the wake word or not, referring to the wake word data 62. For example, the wake word determination unit 58 performs character string search through the voice data of the text and thus determines whether the voice data of the text includes the wake word or not. The wake word included in the voice detected by the second microphone 64 is a first voice. The wake word determination unit 58 outputs wake word detection information representing whether the voice includes the wake word or not, to the server device 4, as the result of the determination.

When the voice detected by the second microphone 64 includes the wake word, the voice data acquisition unit 56 outputs the voice data following the wake word to the server device 4. At this point, the voice data following the wake word is first voice data based on a first voice.

The server device 4 executes a voice assistant function. The voice assistant function is a function of processing an operation corresponding to the voice following the wake word. The voice assistant function is, for example, to turn on and off the power of the projector 2, to start displaying an image, to switch image sources, to project an OSD image, to search for or output information of a video or music, and the like. These operations are classified as the first-type operation of the plurality of types of operations. The voice requesting a first-type operation following the wake word is a first voice. Based on the first voice requesting the first-type operation, first voice data is generated.

The server device 4 gives the projector 2 a command to execute the processing of the first-type operation corresponding to the first voice following the wake word. The operation processing unit 33 of the projector 2 shown in FIG. 2 executes the processing of the first-type operation in response to a processing execution command inputted from the server device 4.

Referring back to FIG. 3, the server device 4 outputs response data to the effect that the voice assistant function is to be executed, to the response unit 59 of the smart speaker 3. The response unit 59 outputs a response signal to the effect that a request for the first-type operation is accepted, to the voice input-output unit 52, based on the response data inputted from the server device 4. The voice input-output unit 52 outputs a voice to the effect that the request is accepted, from the second speaker 63, based on the inputted response data. Thus, the user can recognize that the request is accepted.

Figure 4:
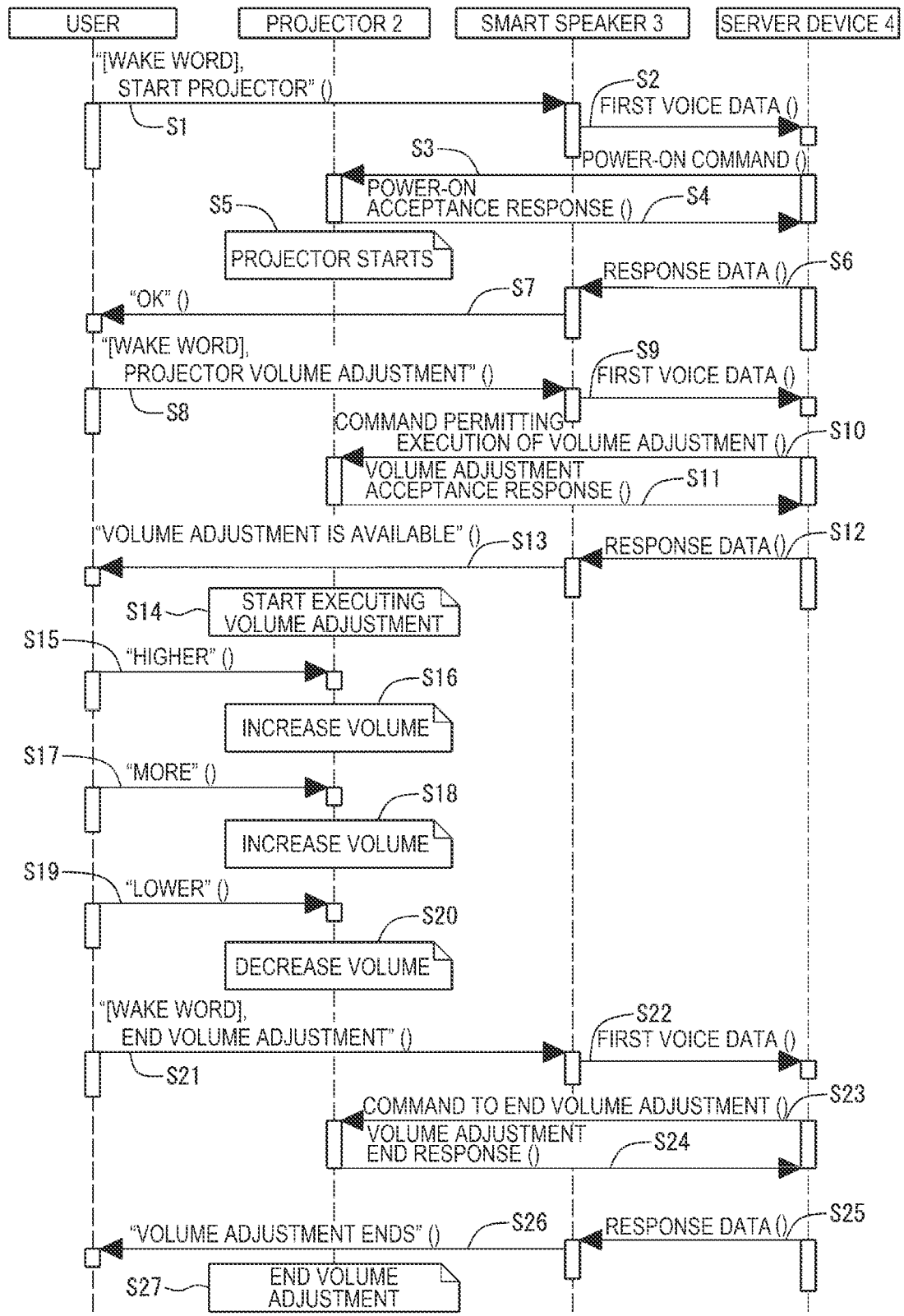
FIG. 4 is a sequence diagram showing an example of a first-type operation and an example of a second-type operation.

A flow of starting the projector 2 as an example of the first-type operation and adjusting the volume as an example of the second-type operation will now be described. This operation is started by the user uttering the wake word and a request to start the projector 2 in step S1, as shown in FIG. 4. For example, the user utters "start the projector" following the wake word. Based on the first voice of this utterance, the smart speaker 3 recognizes the wake word. In step S2, the smart speaker 3 transmits first voice data having the content "start the projector" following the wake word, to the server device 4.

In step S3, the server device 4 transmits a command to turn on the power of the projector 2 to the projector 2, based on the first voice data having the content "start the projector". In step S4, the projector 2 sends a response to the effect that the command to turn on the power is accepted, to the server device 4. In step S5, the projector 2 turns on the power of the projector 2 in response to the command from the server device 4. The startup of the projector 2, which is an example of the first-type operation, is thus executed. In this case, the projector 2 sends a response to the effect that the command to turn on the power is accepted, to the server device 4.

In this case, the first control unit 10 of the projector 2 shown in FIG. 2 turns on the power of the projector 2. The first control unit 10 of the projector 2 also sends a response to the effect that the command to turn on the power is accepted, to the server device 4. Referring back to FIG. 4, in step S6, the server device 4 transmits response data representing that the startup of the projector 2 is accepted, to the smart speaker 3. In step S7, the smart speaker 3 notifies by voice that the request by the user is accepted, based on the response data from the server device 4. At this point, for example, the smart speaker 3 gives a voice notification "OK".

A flow of volume adjustment of the projector 2, which is an example of the second-type operation, will now be described. The processing of volume adjustment of the projector 2 is started by the user uttering the wake word and a request for volume adjustment of the projector 2. In step SB, for example, the user utters "projector volume adjustment" following the wake word. In step S9, the smart speaker 3 transmits first voice data having the content "projector volume adjustment" following the wake word, to the server device 4.

In step S10, the server device 4 transmits a command permitting the execution of the second-type operation, to the projector 2, based on the first voice data having the content "projector volume adjustment". In step S11, the projector 2 sends a response to the effect that the volume adjustment of the projector 2 is accepted, to the server device 4, in response to the command permitting the execution of the second-type operation received from the server device 4.

In step S12, the server device 4 transmits response data representing that the volume adjustment, which is the second-type operation, is accepted, to the smart speaker 3. In step S13, the smart speaker 3 notifies by voice that the request by the user is accepted, based on the response data from the server device 4. At this point, for example, the smart speaker 3 gives a voice notification "volume adjustment is available".

In step S14, the projector 2 starts executing the volume adjustment, which is the second-type operation, in response to the command permitting the execution of the second-type operation received from the server device 4. At this point, the first control unit 10 of the projector 2 shown in FIG. 2 starts executing the second-type operation based on the second voice recognized by the voice recognition unit 32.

In step S15, for example, the user utters "higher", requesting an increase in the volume. In step S16, the projector 2 executes an operation of increasing the volume, based on the second voice "higher". In step S17, for example, the user utters "more", requesting a further increase in the volume. In step S18, the projector 2 executes an operation of increasing the volume, based on the second voice "more". The second-type operation based on the second voice "more" is the same operation as the second-type operation executed immediately before by the projector 2. That is, the second-type operation based on the second voice "more" is an operation of repeating the second-type operation executed immediately before by the projector 2. In step S19, for example, the user utters "lower", requesting a decrease in the volume. In step S20, the projector 2 executes an operation of decreasing the volume, based on the second voice "lower".

As the wording that means an increase in the volume, in addition to "higher", various other words such as "up", "larger", "increase", "large", and "high" are saved in the voice dictionary data 37 shown in FIG. 2. As the wording that means a decrease in the volume, in addition to "lower", various other words such as "down", "smaller", "decrease", "small", and "low" are saved in the voice dictionary data 37. The voice recognition unit 32 determines whether such words used in association with the volume adjustment are included in the voice dictionary data 37 or not, referring to the voice dictionary data 37. When the word used is included in the voice dictionary data 37, the voice recognition unit 32 outputs the result of the voice recognition to the operation processing unit 33, as second voice data. The operation processing unit 33 executes the volume adjustment of the projector 2, based on the second voice data. When the word uttered by the user is not included in the voice dictionary data 37, the voice recognition unit 32 outputs the result of the voice recognition to the effect that the voice is not equivalent to second voice data, to the operation processing unit 33. In this case, the operation processing unit 33 does not execute any processing.

As the wording that means repeating the second-type operation executed immediately before by the projector 2, in addition to "more", various other words such as "further", "once more", "once again", and "again" are saved in the voice dictionary data 37. The voice recognition unit 32 determines whether such words used in association with the second-type operation including the volume adjustment are included in the voice dictionary data 37 or not, referring to the voice dictionary data 37. The voice recognition unit 32 then outputs the result of the determination to the operation processing unit 33.

Referring back to FIG. 4, the second-type operation is ended by the user uttering the wake word and a request to end the volume adjustment of the projector 2 in step S21. For example, the user utters "end volume adjustment" following the wake word. Based on the first voice of the utterance, the smart speaker 3 recognizes the wake word. In step S22, the smart speaker 3 transmits first voice data having the content "end volume adjustment" following the wake word, to the server device 4.

In step S23, the server device 4 transmits a command prohibiting the execution of the second-type operation, to the projector 2, based on the first voice data having the content "end volume adjustment". In step S24, the projector 2 sends a response to the effect that the volume adjustment of the projector 2 is to end, to the server device 4, in response to the command prohibiting the execution of the second-type operation received from the server device 4.

In step S25, the server device 4 transmits response data representing that the volume adjustment, which is the second-type operation, is to end, to the smart speaker 3. In step S26, the smart speaker 3 notifies by voice that the request by the user is accepted, based on the response data from the server device 4. At this point, for example, the smart speaker 3 gives a voice notification "volume adjustment ends". In step S27, the projector 2 ends the execution of the volume adjustment, which is the second-type operation, in response to the command to end the execution of the second-type operation received from the server device 4.

In the display system 1 according to the first embodiment, based on a first voice requesting a permission for the execution of a second-type operation, the projector 2 receives a command permitting the execution of the second-type operation from the server device 4. The first control unit 10 starts executing the second-type operation based on a second voice recognized by the voice recognition unit 32, in response to the command permitting the execution of the second-type operation. Thus, in the execution of the second-type operation, the communication from the smart speaker 3 to the server device 4 and the communication from the server device 4 to the projector 2 can be omitted. Therefore, the time taken for the execution of the second-type operation can be reduced.

A display system 1 according to a second embodiment will now be described. The display system 1 according to the second embodiment has a configuration similar to the configuration of the display system 1 according to the first embodiment except for not having the smart speaker 3 of the display system 1 according to the first embodiment and instead having the projector 2 provided with the functions of the smart speaker 3. In the description below of the display system 1 according to the second embodiment, the same components as those of the display system 1 according to the first embodiment are denoted by the same reference signs as in the first embodiment and are not described further in detail.

Figure 5:
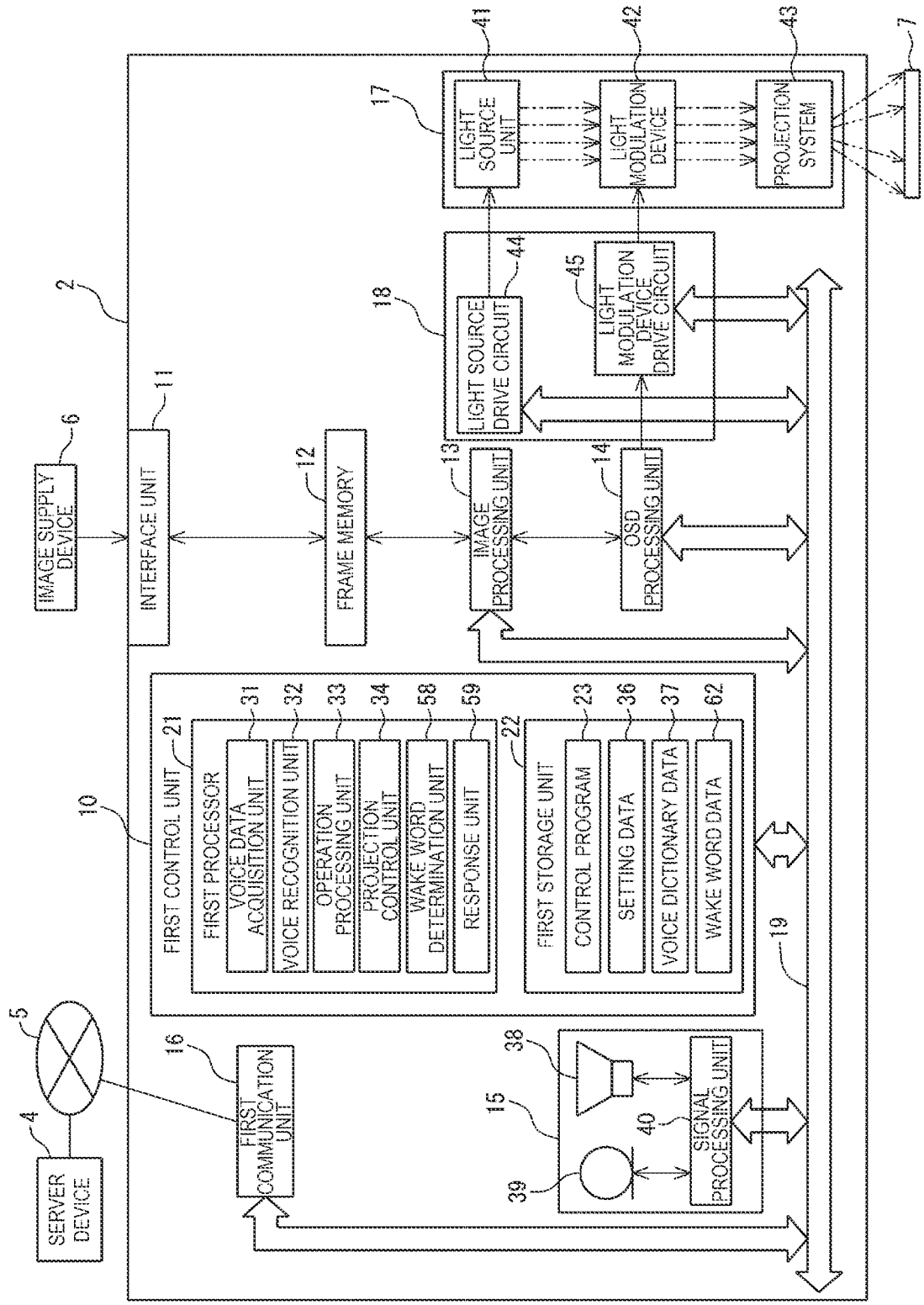
FIG. 5 is a block diagram explaining the configuration of a projector in a second embodiment.

In the display system 1 according to the second embodiment, the projector 2 has the wake word determination unit 58, the response unit 59, and the wake word data 62, as shown in FIG. 5. The projector 2 in the second embodiment has the functions of the second control unit 50, the functions of the second communication unit 51, the functions of the voice input-output unit 52, the functions of the second processor 53, and the functions of the voice data acquisition unit 56 of the smart speaker 3 shown in FIG. 3.

In the projector 2 in the second embodiment, the functions of the second control unit 50 of the smart speaker 3 shown in FIG. 3 are included in the functions of the first control unit 10. Similarly, in the projector 2 in the second embodiment, the functions of the second communication unit 51 are included in the functions of the first communication unit 16. The functions of the voice input-output unit 52 are included in the functions of the voice input-output unit 15. The functions of the second processor 53 are included in the functions of the first processor 21. The functions of the voice data acquisition unit 56 are included in the functions of the voice data acquisition unit 31.

The projector 2 in the second embodiment also includes the second control program 55 and the second setting data 61 of the smart speaker 3 shown in FIG. 3. In the projector 2 in the second embodiment, the second control program 55 shown in FIG. 3 is included in the control program 23 shown in FIG. 5. Similarly, the second setting data 61 shown in FIG. 3 is included in the setting data 36 shown in FIG. 5. The flow of operation processing in the second embodiment is similar to the flow of operation processing in the first embodiment except that the projector 2 performs the processing of the smart speaker 3. Therefore, the flow of operation processing in the second embodiment will not be described further in detail. The display system 1 according to the second embodiment with the above configuration has effects similar to those of the display system 1 according to the first embodiment.

In the first and second embodiments, when the end of the execution of a second-type operation is requested during a period when the second-type operation is permitted, the projector 2 receives a command prohibiting the execution of the second-type operation from the server device 4. The first control unit 10 ends the execution of the second-type operation based on the second voice recognized by the voice recognition unit 32, in response to the command prohibiting the execution of the second-type operation. Thus, the execution of the second-type operation can be ended, based on the first voice requesting the end of the execution of the second-type operation.

The condition for ending the execution of the second-type operation is not limited to that the end of the execution of the second-type operation is requested. The condition for ending the execution of the second-type operation can be that the execution of a first-type operation is requested during the period when the execution of the second-type operation is permitted. For example, the execution of the second-type operation can be ended, based on the user requesting to switch image sources, which is an example of the first-type operation, during the period when the second-type operation is permitted. In this case, the execution of the second-type operation can be ended, based on the projector 2 receiving a command to switch images sources from the server device 4 during the period when the second-type operation is permitted.

That is, during the period when the second-type operation is permitted, first voice data generated based on a first voice requesting a first-type operation is transmitted to the server device 4. Based on this, the projector 2 receives a command prohibiting the execution of the second-type operation from the server device 4. The first control unit 10 ends the execution of the second-type operation based on the second voice recognized by the voice recognition unit 32, in response to the command prohibiting the execution of the second-type operation. Thus, the execution of the second-type operation can be ended, based on the first voice requesting the first-type operation.

In the display system 1 according to the first embodiment, the smart speaker 3 has the second speaker 63. The smart speaker 3 receives, from the server device 4, response data representing a permission in response to the first voice data requesting a permission for the execution of a second-type operation. Based on the response data, the smart speaker 3 notifies by voice that the execution of the second-type operation is to start, from the second speaker 63. Thus, it can be notified by voice that the execution of the second-type operation is to start. In the display system 1 according to the second embodiment, the projector 2 has the speaker 38. The projector 2 receives, from the server device 4, response data representing a permission in response to first voice data requesting a permission for the execution of a second-type operation. Based on the response data, the projector 2 notifies by voice that the execution of the second-type operation is to start, from the speaker 38. Thus, it can be notified by voice that the execution of the second-type operation is to start.

The notification that the execution of the second-type operation is to start is not limited to a voice notification from the smart speaker 3 or a voice notification from the speaker 38. The notification that the execution of the second-type operation is to start can be a notification via characters displayed by the projector 2. The notification via characters displayed by the projector 2 can be implemented by the OSD processing unit 14. Under the control of the first control unit 10, the OSD processing unit 14 displays characters showing that the second-type operation is executable, when the projector 2 receives a command permitting the execution of the second-type operation from the server device 4. Thus, it can be shown by characters that the second-type operation is executable.

In each of the first and second embodiments, when second voices requesting a second-type operation occur successively, a plurality of successive second-type operations can be recognized as one request. For example, when the user utters "higher, higher" during a period when volume adjustment, which is an example of the second-type operation, is permitted, the voice recognition unit 32 includes the two successive second voices into one second voice data as one request. The operation processing unit 33 then executes processing to implement the plurality of second-type operations included in the one second voice data, in response to a command from the first control unit 10. Thus, since a plurality of second-type operations recognized as one request can be executed, the time taken for the execution of a plurality of second-type operations can be made shorter than when only one second-type operation is executed in response to one request. In other words, since a plurality of second-type operations recognized as one request can be executed, the time taken for the execution of a plurality of second-type operations can be made shorter than when a plurality of second-type operations are recognized one by one and executed one by one.

In each of the first and second embodiments, when a plurality of second-type operations recognized as one request include the same content twice successively, the amount of operation in the second second-type operation can be made greater than a prescribed amount of operation. For example, in volume adjustment, which is an example of the second-type operation, the amount of operation to increase the volume is prescribed to a predetermined amount of operation. For example, when the user utters "higher, higher", that is, an operation of increasing the volume twice successively, the amount of operation in the second operation can be made greater than the prescribed amount of operation. This can be achieved by setting the amount of the operation in the second operation to a higher value than the prescribed amount of operation. Thus, a greater amount of operation can be achieved at a time and therefore the time taken for the operation is reduced further.

In each of the first and second embodiments, when a plurality of second-type operations recognized as one request include successive contradictory contents, the amount of operation in the second second-type operation can be made smaller than a prescribed amount of operation. For example, in volume adjustment, which is an example of the second-type operation, the amount of operation to decrease the volume is prescribed to a predetermined amount of operation. For example, when the user successively utters "higher, lower", that is, an operation of increasing the volume and an operation of decreasing the volume, the amount of operation in the second operation can be made smaller than the prescribed amount of operation. This can be achieved by setting the amount of operation in the second operation to a lower value than the prescribed amount of operation. Thus, fine adjustment can be achieved as in the case where the user wants to increase the volume by more than the prescribed amount of operation but wants to have a volume level lower than the volume acquired by increasing the volume twice successively.

What is claimed is:

1. A control method for a display system, the display system including a display device displaying an image, and a voice processing device which generates first voice data based on a first voice requesting a first-type operation belonging to a part of a plurality of types of operations to the display device and transmits the first voice data that is generated, to a server device, the display device receiving a command to execute the first-type operation from the server device, the display device including a voice recognition unit recognizing a second voice requesting a second-type operation that is different from the first-type operation, of the plurality of types of operations, and a control unit controlling execution of the first-type operation and the second-type operation, the control method comprising:

causing the voice processing device to transmit the first voice data generated based on the first voice requesting a permission for the execution of the second-type operation, to the server device;

causing the display device to receive a command permitting the execution of the second-type operation from the server device; and causing the control unit to start the execution of the second-type operation based on the second voice recognized by the voice recognition unit, in response to the command permitting the execution of the second-type operation.

2. The control method for the display system according to claim 1, wherein the voice recognition unit is configured to, when the second voice requesting the second-type operation occurs successively, recognize a plurality of the second-type operations that are successive, as one request, and the control unit executes the plurality of the second-type operations recognized as the one request.

3. The control method for the display system according to claim 2, wherein when the plurality of the second-type operations recognized as the one request include a same content twice successively, the control unit increases an amount of operation in the second-type operation of a second time to be greater than a prescribed amount of operation.

4. The control method for the display system according to claim 2, wherein when the plurality of the second-type operations recognized as the one request include two successive contradictory contents, the control unit reduces an amount of operation in the second-type operation of a second time to be smaller than a prescribed amount of operation.

5. The control method for the display system according to claim 1, wherein the voice processing device transmits, to the server device, the first voice data generated based on the first voice requesting an end of the execution of the second-type operation during a period when the execution of the second-type operation is permitted, and the display device receives a command prohibiting the execution of the second-type operation from the server device, and the control unit ends the execution of the second-type operation based on the second voice recognized by the voice recognition unit, in response to the command prohibiting the execution of the second-type operation.

6. The control method for the display system according to claim 1, wherein the voice processing device transmits, to the server device, the first voice data generated based on the first voice requesting the first-type operation during a period when the execution of the second-type operation is permitted, and the display device receives a command prohibiting the execution of the second-type operation from the server device, and the control unit ends the execution of the second-type operation based on the second voice recognized by the voice recognition unit, in response to the command prohibiting the execution of the second-type operation.

7. The control method for the display system according to claim 1, wherein the voice processing device has a speaker outputting a sound, and the voice processing device receives, from the server device, response data representing a permission in response to the first voice data requesting a permission for the execution of the second-type operation, and notifies by voice that the execution of the second-type operation is to start, based on the response data.

8. The control method for the display system according to claim 1, wherein the control unit displays a character showing that the second-type operation is executable, when the display device receives a command permitting the execution of the second-type operation from the server device.

9. A display system comprising a display device displaying an image, and a voice processing device which generates first voice data based on a first voice requesting a first-type operation belonging to a part of a plurality of types of operations to the display device and transmits the first voice data that is generated, to a server device, the display device receiving a command to execute the first-type operation from the server device, the display device comprising a voice recognition unit recognizing a second voice requesting a second-type operation that is different from the first-type operation, of the plurality of types of operations, and a control unit controlling execution of the first-type operation and the second-type operation, the voice processing device transmitting the first voice data generated based on the first voice requesting a permission for the execution of the second-type operation, to the server device, the display device receiving a command permitting the execution of the second-type operation from the server device, the control unit starting the execution of the second-type operation based on the second voice recognized by the voice recognition unit, in response to the command permitting the execution of the second-type operation.

* * * * *